United States Patent [19]

Byerly

[11] 4,338,707
[45] Jul. 13, 1982

[54] CLAMP

[75] Inventor: Robert M. Byerly, Burbank, Calif.

[73] Assignee: TA Mfg. Corp., Glendale, Calif.

[21] Appl. No.: 128,663

[22] Filed: Mar. 10, 1980

[51] Int. Cl.³ .............................................. B65D 63/00
[52] U.S. Cl. ................................... 24/257; 248/74 R
[58] Field of Search ............. 24/256, 257, 259, 238 R, 24/248 R, 243, 282; 248/74 R

[56] References Cited

U.S. PATENT DOCUMENTS

| | | | |
|---|---|---|---|
| 470,698 | 3/1892 | Murdock | 248/74 R |
| 519,312 | 5/1894 | Arthur | 24/282 |
| 934,663 | 9/1909 | Folger | 248/74 R |
| 947,441 | 1/1910 | Hankin et al. | 248/74 R X |
| 2,396,837 | 3/1946 | Ellinwood | 248/74 R |
| 2,618,450 | 11/1952 | Thomas | 248/74 R |
| 3,061,253 | 10/1962 | Keaton | 248/74 R |
| 3,232,569 | 2/1966 | Deardorf | 248/74 R |

FOREIGN PATENT DOCUMENTS

| | | | |
|---|---|---|---|
| 514959 | 7/1955 | Canada | 248/74 R |
| 2233077 | 1/1974 | Fed. Rep. of Germany | 248/74 R |

Primary Examiner—Roy D. Frazier
Assistant Examiner—Peter A. Aschenbrenner
Attorney, Agent, or Firm—Ellsworth R. Roston; Charles H. Schwartz

[57] ABSTRACT

Apparatus for clamping a cable, wiring or tubing, includes a pair of straps each made from a springlike material and each having a flat portion and a looped portion extending from the flat portion in mating relationship to the looped portion of the other strap to define a clamp. Each of the looped portions has an open configuration at one end for a sliding relationship between the looped portions to define the relative closure of the clamp. The looped portion on one of the straps may extend from the flat portion in a clockwise direction and the looped portion on the other strap may extend from the flat portion in a counterclockwise direction. The flat portions on the straps are disposed relative to each other for clamping to provide for a closure of the clamp. Means such as holes are disposed in the flat portions of the straps for providing for a clamping of the flat portions to obtain a closure of the clamp against the cable, wiring or tubing. Cushion means made from a resilient material are disposed on the looped portions of the straps to facilitate the fixed disposition of the clamp on the cable, wiring or tubing. The cushion means may be slit along its length to provide for a fixed disposition of the clamp on the cable without binding.

13 Claims, 7 Drawing Figures

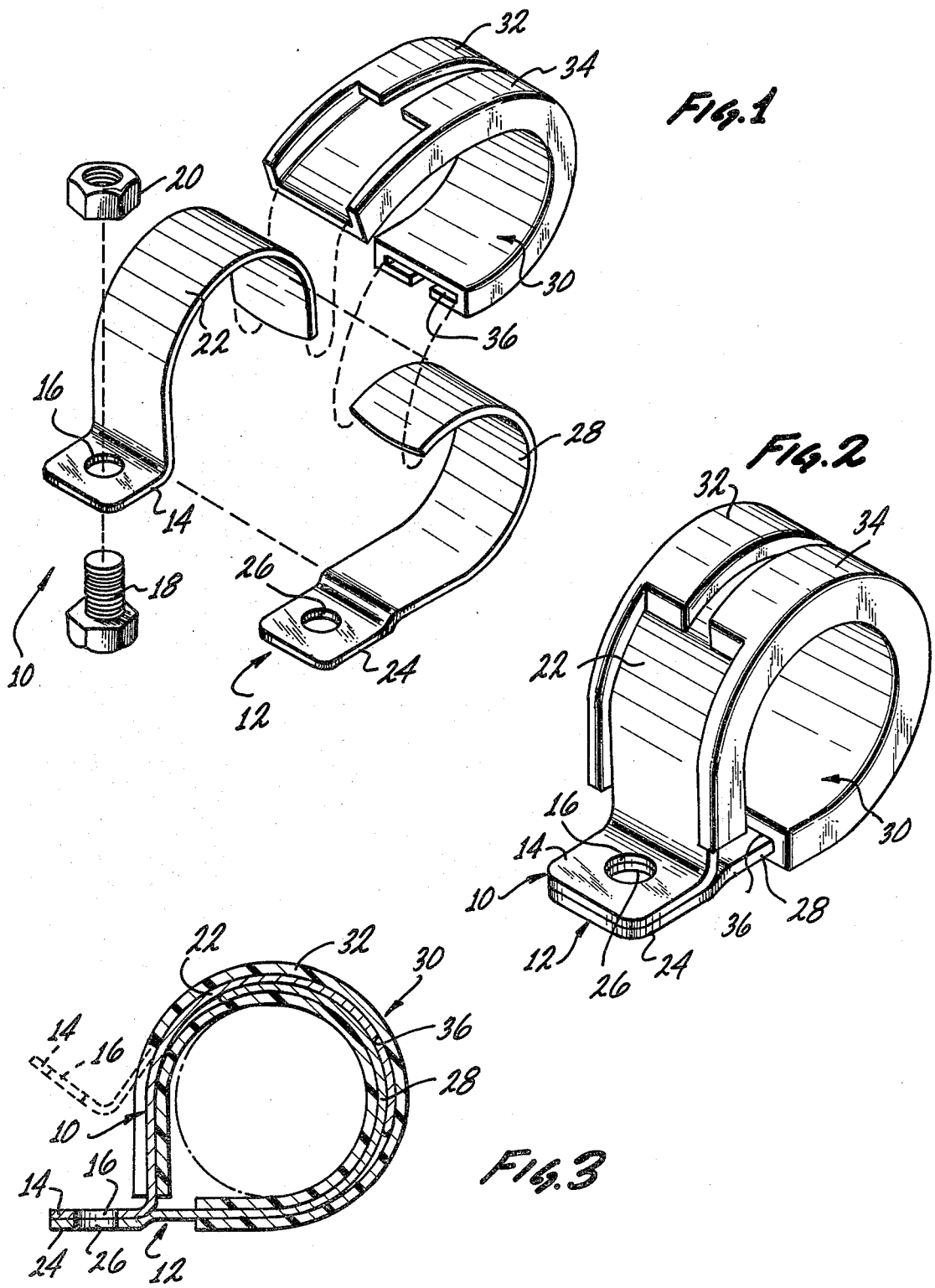

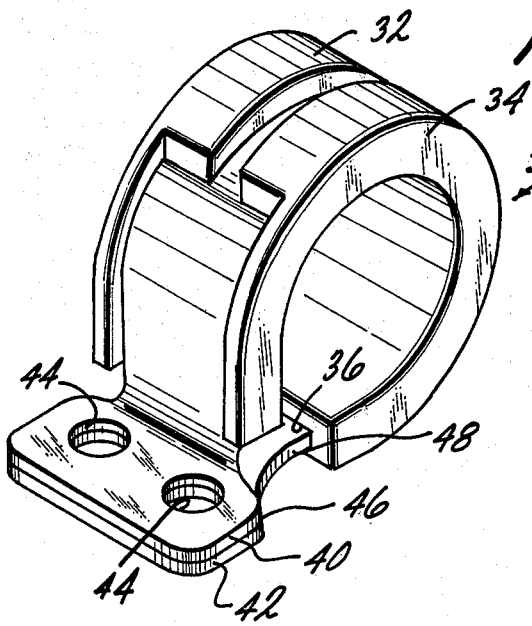

CLAMP

This invention relates to a clamp for retaining an electrical cable or a bundle of wires or tubing in fixed position. More particularly, the invention relates to a clamp which can be easily inserted on a cable or wiring or tubing and easily tightened on the cable or wiring or tubing after such insertion. The invention is also concerned with a clamp which can be fixedly disposed on the cable, wiring or tubing without binding.

Electrical cables or bundles of wires or tubing often extend for considerable distances in electrical systems in which they are included. When the cables or bundles of wires or tubing extend for considerable distances, they are often clamped at progressive positions along these distances in order to insure that the cables or bundles of wires or tubing will have a fixed relationship with other components in the system. In this way, the cables or bundles of wires or tubing cannot interfere with the operation of the electrical system and cannot become damaged.

In such equipment as airplanes, the cables or bundles of wires or tubing have lengths which are quite considerable. For example, a commercial airplane carrying hundreds of passengers probably includes miles of cables or bundles of wires or tubing. Since these cables or bundles of wires or tubing have to be clamped at progressive intervals, the number of clamps in such an airplane is probably in the thousands or tens of thousands. It is accordingly important that the clamps be capable of being easily inserted on the cables or bundles of wires or tubing and being easily positioned in fixed relationship to the cables or bundles of wires or tubing. It is also important that such insertion and fixed disposition of the clamp on the cables be accomplished without binding of the clamps or damage to the cables or bundles of wires or tubing.

A considerable effort has been made in the prior art to provide a clamp which will provide the features described in the previous paragraph. In spite of such efforts, no one has been able to provide a clamp with all of such features. For example, clamps have been provided which can be relatively easily inserted and fixedly disposed on cables or bundles of wires but such clamps have tended to bind and also to damage the cables or bundles of wires or tubing. Other clamps have been provided which will not bind or damage the cables or bundles of wires or tubing but such clamps have been relatively difficult to insert and fixedly dispose on the cables or bundles of wires or tubing.

This invention provides a clamp which overcomes the difficulties specified above. The clamp of this invention is easily inserted and fixedly disposed on a cable or a bundle of wires or tubing. The clamp further retains the cable or bundle of wires in fixed disposition without binding or without damaging the cable or bundle of wires or tubing.

The clamp of this invention includes a pair of straps each made from a springlike material and each having a flat portion and a looped portion extending from the flat portion in mating relationship to the looped portion on the other strap. Each of the looped portions has an open configuration at one end for a sliding relationship between the looped portions to define the relative closure of the clamp. The looped portion on one of the straps may extend from the flat portion in a clockwise direction and the looped portion on the other strap may extend from the flat portion in a counterclockwise direction.

The flat portions on the straps are disposed relative to each other for clamping to provide for a closure of the clamp. Means such as holes are disposed in the flat portions of the straps for providing for a clamping of the flat portions to obtain a closure of the clamp against the cable or bundles of wires or tubing.

Cushion means made from a resilient material are disposed on the looped portions of the straps to facilitate the fixed disposition of the clamp on the cable or bundles of wires or tubing. The cushion means may be slit along its length to provide for a fixed disposition of the clamp on the cable or bundle of wires or tubing without binding.

The cushion means may be provided with a wedge portion on the surface contacting the cable or bundle of wires or tubing. The wedge portion is provided with a configuration to provide a closure of the loop by the cushion means upon the clamping of the flat portions of the cables or bundles of wires or tubing. The cushion means may be defined by a single member or a pair of members respectively disposed on the looped portions of individual ones of the straps. These portions cooperate with each other to define substantially a closed loop when the clamp is disposed in fixed relationship on the cable or bundle of wires or tubing.

In the drawings:

FIG. 1 is an exploded perspective view of one embodiment of a clamp constituting this invention;

FIG. 2 is a perspective view of the embodiment shown in FIG. 1 with the members in their assembled relationship;

FIG. 3 is a sectional view in elevation of the embodiment shown in FIGS. 1 and 2 with the members in their assembled relationship and with one of the members shown in broken lines in a shifted position to facilitate the disposition of the members on a cable or a bundle of wires or tubing;

FIG. 4 is a perspective view of a second embodiment of the invention with the members in their assembled relationship;

FIG. 5 is a perspective view of a third embodiment of the invention;

FIG. 6 is a perspective view of a fourth embodiment of the invention with the members in their assembled relationship; and FIG. 7 is a sectional view in elevation of the assembled embodiment shown in FIG. 6.

In one embodiment of the invention, a pair of straps generally indicated at 10 and 12 are made from a suitable material such as spring steel. The straps 10 and 12 are provided with a thin flat configuration and are provided with a relatively great lateral dimension relative to their thickness. The straps 10 and 12 are adapted to be disposed in mating relationship to define a clamp.

The strap 10 may be provided with a flat portion 14 at one end. Means such as a hole 16 may be provided at the free end of the flat portion 14 to receive a bolt 18, which cooperates with a nut 20 to dispose the clamp fixedly on a cable 21 or a bundle of wires or tubing. A looped portion 22 extends from the flat portion 14 in a clockwise direction. The loop defined by the portion 22 is normally partially open.

The strap 12 may be provided with a flat portion 24 at one end. Means such as a hole 26 may be provided at the free end of the flat portion 24 to receive the bolt 18. A looped portion 28 extends from the flat portion 24 in a counterclockwise direction. The loop defined by the portion 22 is also normally partially open.

The looped portions 22 and 28 have configurations which provide for a mating relationship between such portions. In such a mating relationship, the looped portions 22 and 28 partially close the opening provided in such portions. When the looped portions 22 and 28 are in mating relationship, the flat portions 14 and 24 are in adjacent relationship and the holes 16 and 26 are aligned so that the bolt 18 can be inserted through the holes.

Cushion means generally indicated at 30 are disposed on the clamp formed by the straps 10 and 12. The cushion means may be formed from a suitable resilient material such as a rubber. The cushion means 30 may be provided with a thin flat configuration and may be defined by a continuous body portion slit at one of its flat surfaces to define a pair of spaced lip portions 32 and 34. The cushion means is hollow as at 36 to receive the straps 10 and 12.

The looped portions 22 and 28 are slidable relative to each other when they are disposed in mating relationship. Because of this, the looped portion 22 is slid relative to the portion 28 in a direction for increasing the opening defined by the portions before the portions are inserted on the cable 21 or bundle of wires. This facilitates the easy insertion on the cable 21 or bundle of wires of the clamp formed by the straps 10 and 12. The sliding of the looped portion 22 relative to the looped portion 28 is indicated in broken lines at 38 in FIG. 3.

After the clamp has been properly positioned on the cable 21 or bundle of wires, the flat portions 14 and 24 are manually grasped and pressed toward each other as shown in solid lines in FIGS. 2 and 3. This tightens the looped portions on the cable or the bundle of wires. The bolt 18 is then tightened on the nut 20 to maintain the clamp in fixed disposition on the cable 21 or the bundle of wires.

In addition to providing for easy insertion and fixed disposition on the cable 21 or bundle of wires, the clamp described above has several other important advantages. For example, the cushion means 30 functions as a guide to provide for a sliding adjustment between the looped portions 22 and 28. The cushion means 30 also functions to distribute the forces exerted by the cable 21 or the bundle of wires on the clamp. In this way, the forces exerted on the clamp are substantially equal in all of the positions constituting the full area of contact between the clamp and the cable 21 or the bundle of wires.

The disposition of the straps 10 and 12 in the cushion means 30 also prevents the straps from being pivoted at one side against the cable 21 or the bundle of wires. As a result, the clamp does not bind against the cable 21 or the bundle of wires. This prevents the cable 21 or the bundle of wires from being damaged in any way. This is true even if the clamp should be tightened somewhat excessively against the cable 21 or the bundle of wires.

FIG. 4 illustrates a modification of the clamp shown in FIGS. 1 and 2 and described above. In the modification shown in FIG. 4, the flat portions 14 and 24 are widened at their free ends to respectively define spade portions 40 and 42. Each of the spade portions 40 and 42 may be provided with a pair of holes 44 to receive detent means such as bolts.

By providing a pair of spaced bolts to dispose the clamp fixedly on the cable 21 or the bundle of wires, the fixed disposition of the clamp on the cable is facilitated.

The embodiment of FIG. 4 is also different from the embodiment of FIGS. 1 and 2 in another respect. As will be seen, the flat portions 14 and 24 are recessed at their ends as at 46 so that the spade portions 40 and 42 are displaced vertically from intermediate sections 48 of the flat portions 10 and 12. This displacement of the spade portions 40 and 42 from the intermediate portions 48 facilitates the provision of flat surfaces for the spade portions. Such flat surfaces are instrumental in providing for a fixed disposition of the clamp on the cable 21 or the bundle of wires at any desired position.

The cushion means 30 described above is formed from a single resilient element. It will be appreciated, however, that the cushion means 30 may be formed from more than one element. For example, two cushion elements 50 and 52 define the cushion means 30 in the embodiment of FIG. 5. The cushion element 50 is disposed on the strap 10 and the cushion element 52 is disposed on the strap 12. As shown in FIG. 5, the cushion element 50 is displaced on the straps from the cushion element 52. Such a displaced relationship of the cushion elements 50 and 52 may be provided to facilitate the insertion of the clamp on the cable.

Each of the cushion elements 50 and 52 may be formed in a manner described above for the embodiment shown in FIGS. 1, 2 and 3. Thus, when the straps 10 and 12 are disposed in mating relationship, the cushion elements 50 and 52 abut to define the cushion means. However, when the cushion elements 50 and 52 abut, they may define a loop more closed than in the embodiments described above. This provides additional protection to the clamp and the cable 21 when the clamp is disposed on the cable.

A wedge 60 is provided on the cushion means 30 in the embodiment shown in FIGS. 6 and 7. The wedge 60 is disposed at one end of the cushion means on the surface of the cushion means abutting the cable 21 or the bundle of wires. The wedge 60 extends in a direction for closing the loop, particularly when the clamp is fixedly disposed on the cable. In this way, the wedge 60 facilitates protection of the cable 21 and also helps to prevent binding of the clamp.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In combination for clamping a cable,
   a first strap having a flat portion and having a portion extending in a loop from the flat portion in a clockwise direction,
   a second strap having a flat portion and having a portion extending in a loop from the flat portion in a counterclockwise direction,
   the looped portions having surfaces disposed in mating relationship to define a clamp and having their flat portions disposed in adjacent relationship, the surfaces on the first and second straps with the mating relationship being smooth to facilitate a slidable relationship between such surfaces,
   the first and second straps being made from a material having springlike characteristics to adjust the area encompassed by the clamp in accordance with pressures exerted on the flat portions for bringing the flat portions of the first and second straps into abutting relationship, and cushion means made from a resilient material and enveloping the looped portions defined by the first and second straps of the clamp and having properties of distributing the forces exerted by the cable on the clamp, the cushion means being constructed to provide a guide for the sliding movement of the looped portions of the first and second straps relative to each other.

2. The combination set forth in claim 1 wherein the first and second straps are made from a flat material and wherein the cushion means is provided with a slit along the length of the cushion means to facilitate the positioning of the cushion means on the straps.

3. The combination set forth in claim 1 wherein the first and second straps are made from a thin flat material having springlike characteristics and having a great lateral dimension relative to their thickness and wherein the cushion means is made from a thin flat material having resilient properties and is disposed in enveloping relationship to the clamp to maintain the clamp against the cable without binding and to guide the sliding relationship between the looped portions of the first and second straps.

4. The combination set forth in claim 1 wherein holes are provided in the flat portions of the first and second straps to receive detent means for holding the clamp in fixed positioning against the cable.

5. In combination for clamping a cable,
a pair of straps made from a springlike material and having looped portions extending in opposite directions in a mating relationship between adjacent surfaces on the clamps to define a clamp and having flat portions extending from the looped portions in adjacent relationship to each other, the adjacent surfaces on the straps being smooth to facilitate a slidable relationship between the surfaces, and
cushion means made from a resilient material and disposed around the looped portions of the pair of straps in the clamp and constructed to guide the slidable relationship between the straps and to distribute the forces of the cable on the clamp.

6. The combination set forth in claim 5 wherein each of the straps defines a loop open at one end and the open end of each loop is opposite the open end of the other loop and wherein the straps in their mating relationship define substantially a closed loop.

7. The combination set forth in claim 6 wherein the straps are made from a thin flat material having a great lateral dimension relative to the thickness of the material and the cushion means are made from a thin flat material slit along the length of the cushion means to facilitate the disposition of the cushion means on the cable without binding of the clamp and to guide the slidable relationship between the looped portions of the pair of straps.

8. The combination set forth in claim 7 wherein openings are provided in the flat portions of the straps to receive detent means for facilitating the disposition of the clamp in fixed relationship on the cable.

9. In combination for clamping a cable,
a pair of straps each made from a springlike material and each having a flat portion and a looped portion extending from the flat portion in mating relationship to the looped portion on the other strap to define a clamp, each of the looped portions having an open configuration at one end for an abutting and sliding relationship between the looped portions to define the relative closure of the clamp, the flat portions on the straps being disposed relative to each other for clamping to provide for a closure of the clamp, the abutting surfaces of the straps being provided with smooth surfaces to facilitate the sliding relationship between the looped portions,
means disposed in the flat portions of the straps for providing for a clamping of the flat portions to obtain a closure of the clamp, and
cushion means made from a resilient material and disposed on the looped portions of the straps to facilitate the fixed disposition of the straps relative to each other and of the clamp on the cable, when the clamp is disposed on the cable, the cushion means being constructed to serve as a guide when the looped portions of the straps are slid relative to each other.

10. The combination set forth in claim 9 wherein the cushion means are defined by a flat member enveloping the looped portions of the straps in the mating relationship of the straps to facilitate the fixed disposition of the straps relative to each other and the disposition of the clamp in fixed disposition on the cable without binding of the clamp and to distribute the forces of the cable on the clamp when the clamp is disposed on the cable.

11. The combination set forth in claim 9 wherein the cushion means are defined by a pair of flat cushion elements respectively disposed on the looped portions of individual ones of the straps, each of the cushion elements defining a portion of a loop and cooperating with the other cushion element in the mating relationship of the looped portions to define substantially a closed loop and to distribute the forces of the cable on the clamp and to facilitate the fixed disposition of the straps relative to each other when the clamp is disposed in fixed relationship on the cable.

12. The combination set forth in claim 9 wherein the cushion means is provided with a wedge portion on the surface contacting the cable and the wedge portion is provided with a configuration to provide substantially a closure of the loop by the cushion means upon the clamping of the flat portions of the straps.

13. The combination set forth in claim 9 wherein means are disposed at the ends of the flat portions of the straps to provide for a clamping of the clamp on the cable.

* * * * *